United States Patent Office 3,272,576
Patented Sept. 13, 1966

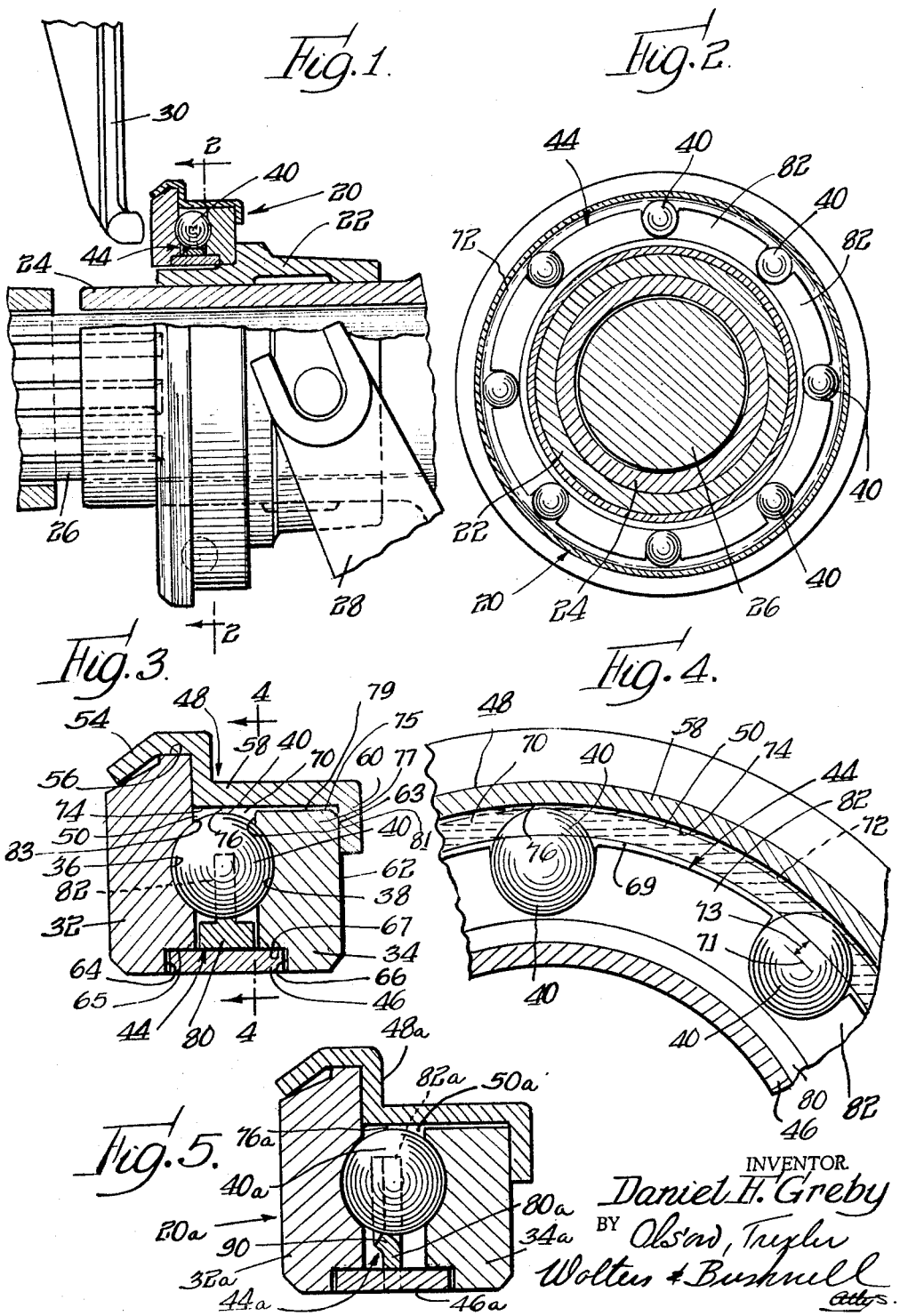

3,272,576
SEALED BALL THRUST BEARING
Daniel F. Greby, Maywood, Ill., assignor to Textron Inc., Providence, R.I., a corporation of Rhode Island
Filed May 4, 1965, Ser. No. 453,015
8 Claims. (Cl. 308—233)

This application is a continuation-in-part of applicant's pending application Ser. No. 241,832, filed Dec. 3, 1962, and now abandoned.

The present invention relates to antifriction thrust bearings which transmit thrust loads through bearing balls. For brevity of expression, such bearings will be referred to as "ball thrust bearings."

Bearings of this type have many uses in machinery and are commonly used as clutch release bearings in automotive vehicles. In many environments in which such bearings are used, it is impractical to relubricate a bearing after it has been placed into service. The service life of conventional ball thrust bearings has been limited by the fact that the initial charge or supply of grease normally placed in such bearings has provided adequate lubrication for the bearing balls and bearings races for only limited periods of time.

As a consequence, a most common cause of failure of conventional ball thrust bearings in service has been inadequate lubrication. It is not unusual for a conventional ball thrust bearing to fail in service because of poor lubrication of balls and races, even though the initial charge of grease in the bearing has been only partially consumed.

As indicated in the preceding paragraphs, the invention is concerned with ball thrust bearings that are charged with lubricant and sealed at the time the bearings are manufactured. The two thrust races of such a bearing are interconnected by means designed to form a seal between the two races and retain in the bearing the original charge of lubricant, no provision normally being made to introduce additional lubricant into the bearing once it has been placed in service.

As a practical matter, the service life of a sealed ball thrust bearing of this character is limted by the duration of the effectiveness of the lubrication provide by the original charge of lubricant. In this respect such sealed bearings differ from unsealed bearings which may run in an oil bath or otherwise be used in such manner that the bearings receive lubricant from the environment after going into service.

One object of the invention is to provide a sealed ball thrust bearing having a new and improved construction which markedly prolongs the service life of the bearing by extending the service period during which effective lubrication of the bearing is provided by the grease placed in the bearing when it is new.

Another object is to provide a sealed ball thrust bearing having an extended service life achieved by means of a new and improved positioning of the grease space in the bearing in relation to the annular path of the bearing balls, the "grease" space being internal void space unoccupied by bearing structure and therefore available to contain grease.

A further object is to provide a sealed ball thrust bearing of improved construction in which effective lubrication of the bearing balls and races over an extended service life of the bearing is extended by means of improved physical relationships of the bearing structure that provide for both accommodation of an optimum supply of grease in the bearing and the substantially complete utilization of all of the grease in the bearing to provide effective bearing lubrication.

Another object is to provide a sealed ball thrust bearing in which the volume of grease made available in the bearing for effective lubrication of the bearing is increased by new and improved physical relationships of the bearing structure which involve a shrinkage of the volume of the grease space within the bearing, as compared to conventional sealed ball thrust bearings of similar size.

A further object is to provide a sealed ball thrust bearing in which new and improved relationships of structural components of the bearing extend the service life of the bearing by virtually eliminating from the grease space within the bearing "dead" zones within which the supply of grease could become ineffective for lubricating the bearing.

Another object is to provide a sealed ball thrust bearing, as recited in the preceding objects, having an extended service life that is further extended and assured by charging the bearing at the time of manufacture with an optimum quantity of solid grease.

Other objects and advantages will become apparent from the following description of the exemplary embodiments of the invention illustrated in the drawings, in which:

FIGURE 1 is a partially sectioned side view showing a ball thrust bearing embodying the invention installed to function as a clutch release bearing;

FIG. 2 is a transverse sectional view, taken with reference to the line 2—2 of FIG. 1;

FIG. 3 is a fragmentary axial sectional view of the bearing on an enlarged scale and corresponding to the sectioned portion of the bearing as it appears in FIG. 1;

FIG. 4 is a fragmentary sectional view of the bearing on a large scale, taken with reference to the line 4—4 of FIG. 3; and FIG. 5 is a fragmentary axial transverse sectional view similar to FIG. 3, but showing a modified ball spacer element housed within the bearing structure.

Referring to the drawings in greater detail, the ball thrust bearing 20 forming the first illustrated embodiment of the invention, FIGS. 1 to 4, is adapted for use as a clutch release bearing in an automotive vehicle, for example. A typical installation of the bearing 20 is illustrated in FIG. 1, which shows the bearing 20 mounted on a non-rotatable collar or slide 22 which encircles a stationary sleeve 24 housing a power shaft 26.

In the installation shown, a bifurcated clutch release lever 28 coacts with the collar 22 to move the collar axially to the left, with reference to FIG. 1, causing the thrust bearing 20 carried by the collar to engage a number of clutch release arms 30, (only one of which is shown in FIG. 1) which rotate about an axis concentric with the bearing 20. The thrust bearing 20 transmits clutch releasing thrust from the non-rotating collar 22 to the rotating clutch release arms 30 to swing the arms 30 in a clutch releasing direction.

Structurally, the thrust bearing 20 comprises two annular thrust members 32, 34 disposed in axially confronting, concentric relation to each other. As shown, the two annular thrust members 32, 34 are formed by generally flat rings identified respectively by the same reference numbers, 32, 34.

The annular thrust member or ring 32 defines a circular ball race 36 facing axially toward a similar ball race 38 formed in the thrust ring 34 in confronting relation to the race 36.

Thrust loads are transmitted between the two thrust members 32, 34, which are rotatable in relation to each other by an annular series of bearing balls 40 which are disposed between the thrust rings in rolling engagement with both races 36, 38.

The bearing balls 40 are maintained in circumferentially spaced relation to each other by an annular ball spacing member or element denoted generally by the number 44.

The two thrust rings 32, 34 are bridged or spanned axially by an inner annular retaining element or bearing shell member 46 and an outer annular retaining element or bearing shell member 48, which together with the two thrust rings enclose an annular space 50. For convenience in description, the closed annular space 50 will be referred to generally as the "grease space."

Specifically, this "grease space" 50 within the bearing comprises the space bounded by the thrust rings 32, 34 and inner and outer retaining elements or members 46, 48, reduced in volume by the bearing balls 40 and the annular ball spacing element 44. In other words, the "grease space" 50 is the internal void space in the bearing that is unoccupied by bearing structure, other than grease, and is available for containing grease. Upon rotation of the thrust rings 32, 34 relative to each other, the bearing balls 40 travel through an annular path extending through the grease space 50.

As implied by the terminology, the grease space 50 is used to accommodate within the bearing grease which serves to lubricate the bearing balls and races. Each of the inner and outer bearing shell members 46, 48 has a close fitting relationship to each of the thrust rings 32, 34 which is designed to serve as an effective seal against the escape of grease from the grease space 50 past the bearing shell member.

The outer member 48 coacts with the two thrust rings 32, 34 to prevent movement of the thrust rings away from each other, thereby holding both bearing races 36, 38 in running engagement with the balls 40.

As shown in FIG. 3, the left marginal edge 54 of the outer shell member 48 is sealably secured to the outer periphery 56 of the thrust ring 32, which extends a substantial distance radially beyond the annular path of the balls 40 and radially beyond the other thrust ring 34. In the preferred construction illustrated, the outer shell member 48 has a generally cylindrical main portion 58 which encircles the thrust ring 34 and extends to the thrust ring 32 in encircling relation to the annular series of balls 40. At the juncture of its cylindrical portion 58 with the thrust ring 32, the shell member 48 is turned radially outward and around the outer periphery 56 of the thrust ring 32 where the marginal edge 54 of the outer shell is spun over the thrust ring 32 to firmly and sealably lock the outer shell member on the thrust ring 32, as previously recited.

The opposite marginal edge of the outer shell member 48 is turned radially inward to form a radial lip 60 which has a close running fit with the side 62 of the thrust ring 34 opposite from the race 38. The close, sliding or running fit of the inwardly turned lip 60 with the thrust ring surface 62 tends to form an effective barrier or seal against the escape of grease from the grease space 50 past the outer retaining member 48 and thrust ring 34. It will be noted with reference to FIG. 3 that the lip 60 extends a rather extensive radial distance radially inward from the cylindrical portion 58 of the outer retaining member 48 and extends a nearly equal distance radially inward along the adjacent thrust member surface or side 62. Thus, in the construction shown the lip 60 extends radially inward into the immediate vicinity of the radial positions of the centers of the bearing balls 40. As a consequence, the grease seal between the lip 60 and the thrust ring 34 is effective at a radially inner position that has a radially inward spacing from the radially outward boundary of the grease space 50 that is quite large in relation to the radius of the balls 40. As a matter of fact, the dimensional distance to which the seal between the lip 60 and the side surface 62 extends radially inward from the cylindrical portion 58 of the retaining member 48 exceeds the radius of the balls 40 in the construction shown.

The grease seal formed by the close relationship of the lip 60 to the thrust ring surface 62, as the lip 60 slidably overlaps a wide radial band of the thrust member surface 62, can be accurately described as a "capillary" seal, denoted in FIG. 3 by the reference number 63. The close relationship of lip 60 and the thrust ring surface 62 which form the capillary seal between these components of the sealed bearing also operates in the construction disclosed to effect the previously mentioned prevention of movement of the thrust rings 32, 34 away from each other.

The inner shell member 46 has a simple cylindrical shape. The two opposite marginal edges of the inner shell member 46 extend into two confronting annular grooves or notches 64, 66 formed in the respective thrust rings 32, 34. The inner shell member 46 has a close sliding or running fit with each of the thrust rings 32, 34 which tends to form an effective barrier or seal against the escape of grease from the grease space 50 past the inner shell member. In the preferred construction shown, the opposite marginal edges of the inner shell member 46 slidably overlap the respective thrust rings 32, 34 for substantial axial distances and form with the thrust rings capillary seals 65, 67 similar to the capillary seal 63 formed between the thrust ring surface 62 and the inturned lip 60 on the outer shell member 48.

It will be understood that, as such, capillary seals, generally similar to the seals 63, 65, and 67 used in the bearing 20, have been incorporated previously in sealed ball thrust bearings to seal the bearings against the escape of grease. While the capillary seals 63, 65 and 67 provide for free rotation of the thrust rings 32, 34 in relation to each other and are normally effective to seal the bearing against the escape of grease, they are not effective to contain any substantial fluid pressure within the bearing, Hence, in the event of whipping or aeration of the grease in the bearing causing its volume to expand sufficiently to exceed the void or grease space in the bearing, a positive pressure will build up in the bearing with the result that some of the grease is forced out through the capillary seals to relieve the internal pressure.

As previously intimated, ball thrust bearings of the type with which this invention is concerned are normally used in environments where it is impractical to relubricate a bearing in service. Hence, the initial charge or supply of grease placed in a bearing of this type when it is manufactured is relied on to provide lubrication of the bearing balls and races throughout the life of the bearing.

A most common cause of failure of conventional ball thrust bearings in service has been progressive deterioration of the lubrication afforded to the balls and races of bearings in service, to the extent that effective lubrication no longer was obtained and bearings failed.

Since failure of ball thrust bearings because of deteriorating lubrication has been a recognized shortcoming of these bearings, there has been a natural tendency to initially charge such bearings with a rather large amount of grease, and to provide within the bearings rather large grease spaces to accommodate the grease. The effectiveness of these expedients in extending the service life of ball thrust bearings has been limited by the fact that it is not uncommon for conventional ball thrust bearings to fail in service because of poor lubrication even though relatively large quantities of grease remain in the bearings.

As compared to conventional sealed ball thrust bearings, sealed ball thrust bearings provided by the invention have a very materially extended service life achieved by a prolongation of the time during which the grease, placed in the bearing at the time of manufacture of the bearing, continues to provide effective lubrication for the bearing. Sealed ball thrust bearings embodying the invention are constructed and loaded with grease in a manner that avoids loss of lubricating effectiveness of grease placed in the bearings.

Component elements of the sealed ball thrust bearing provided by the invention are shaped and positioned in relation to each other to provide an orientation or positioning of the void or grease space 50 in relation to the orbital path 72 of the bearing balls 40 which prevents any substantial portion of the grease loaded into the bearing from retreating into dead space where the grease becomes ineffective to lubricate the bearing.

Having reference to the drawings, structural components of the bearing which house and coact with the bearing balls 40; particularly the thrust rings 32, 34, the outer retaining or shell member 48, and the ball spacing element 44; are shaped and positioned in relation to each other to locate or position the internal void or grease space 50 in relation to the orbital path 72 of the bearing balls 40 so that no more than one-half or fifty percent of the grease space 50 is located radially outward of an imaginary reference surface 69 (represented by the arcuate line 69 in FIG. 4) of circular cylindrical shape that is coaxial with the bearing and located radially outward of the center 71 of each ball by a radial distance 73 equal to one-fifth or twenty percent of the diameter of each ball 40. In the preferred construction illustrated in the drawings, the positioning of the void or grease space 50 in relation to the orbital path of the bearing balls 40 is such that only two-fifths or forty percent of the volume of the grease space 50 is located radially beyond the imaginary reference surface 69. The portion of the grease space 50 located radially beyond the reference surface 69 is shaded in FIG. 4 by shading 70.

Location of the grease space 50 radially in relation to the orbital path 72 of the balls 40 is achieved more particularly in accordance with the invention by minimizing the volume of the grease space 50 located radially outward of the orbital path 72 of the balls while at the same time providing an ample volume of grease space located radially inward of the radially outer boundary of the orbital path 72 of the balls.

To minimize that portion of the volume of the grease space 50 which lies radially outward beyond the annular path 72 of the bearing balls, the outer retaining or shell member 48 is shaped and positioned in relation to the bearing races 36, 38 so that the radial spacing between the outer boundary 72 of the annular path of the balls 40 and the adjacent inner surface 74 on the outer retaining membr 48 encircling the path of the balls is reduced substantially to the bare minimum required to assure adequate clearance for movement of the balls. The radial spacing between the balls 40 and the adjacent surface 74 on the retaining member 48 is identified in FIGS. 3 and 4 by the number 76.

Having reference to the preferred construction shown in the drawings and illustrated best in FIG. 3, it should be noted that the thrust ring 34 encircled by the outer retaining or shell member 48 is shaped and positioned in relation to the outer shell member to avoid creation of grease space of any significant volume between the thrust ring and the encircling shell member 48. More particularly, the outer periphery of the thrust ring 34 defines a cylindrical surface 75 extending across the entire axial width of the portion 77 of the thrust ring 34 located radially outward of the race 38 and spanned axially by the inner surface 74 on the shell member 48. The cylindrical surface 75 on the thrust ring 34 has only sufficient radial clearance 79 from the inner surface 74 of the shell member 48 to assure free rotation of the thrust ring 34 in relation to the shell member 58.

It will be further noted with reference to the preferred construction illustrated that the thrust ring 34 defines a flat surface 81 extending radially outward from the race 38 to the cylindrical surface 79 and the race ring 32 defines a flat surface 83 extending radially outward from the race 36 to the inner surface 74 on the outer shell member 48. Using the construction thus described, the inner surface 74 on the outer shell member 48 is located in relation to the orbital path 72 of bearing balls so that the radial distance 76, FIG. 3, between the shell inner surface 74 and the orbital path 72 of the balls does not exceed fifteen percent of the diameter of each bearing ball 40. For best results, it is preferred that the radial distance 76 between the shell surface 74 and the orbital path 72 of the balls be much less than fifteen percent of the ball diameter, the clearance 76 between the surface 74 and ball path 72 being preferably only sufficient to assure a running clearance for the balls using normal manufacturing tolerances.

Even though the grease space 50 is radially restricted so that it does not extend radially substantially beyond the annular path 72 of the bearing balls, the grease space is at the same time adapted to accommodate an optimum charge or supply of grease 70.

The previously mentioned bearing spacer element 44 is designed to accommodate the close radial relationship of the grease space bounding surface 74 to the bearing balls 40, and to provide at the same time for reception of an optimum charge of grease within the bearing.

The bearing spacer element 44 is designed so that it does not extend radially beyond the radially outward boundary of the annular bearing ball path 72. As illustrated in FIGS. 3 and 4, the spacer element 44 comprises an annular base ring 80, disposed between the inner retaining member 46 and the bearing balls, and a plurality of ball spacer elements or blades 82 that project radially outward from the base ring 80 into intervening relation to successive balls 40, as shown, to maintain the balls in circumferentially spaced relation to each other. The spacer blades or elements 82 stop radially short of the outer boundary of the bearing ball path 72 and preferably have a thickness which is much less than the axial spacing between adjacent, opposing portions of the two thrust members. As shown, the thickness of the individual spacer elements 82, measured axially with respect to the thrust members 32, 34, is only a minor fraction of the diameter of the individual balls 40, being specifically one-fifth of the diameter of the balls. Also, as shown, the radial spacings of the radial extremities of the spacer elements 82 from the outer boundary of the orbital path 72 of the bearing balls 40 are major fractions of the radii of the individual balls, being specifically of the order of two-thirds of the radius of each ball. This construction provides generous space between the balls 40 for accommodation of grease.

The grease space 50 positioned in relation to the annular path 72 of the balls in accordance with the invention is loaded with solid grease at the time the bearing is manufactured. For lubricating the bearing a grease is selected having a chemical composition suited for service in the environment in which the bearing will be used. Normally greases are used having penetration numbers between 175 and 295 according to standards set by the American Society for Testing Materials.

For greases of the character described, the volume of grease loaded into the bearing 20 in accordance with the invention is limited so that it does not exceed one-half or fifty per cent of the volume of the void or grease space 50. In the bearing illustrated, the volume of the grease loaded into the bearing is equal to two-fifths or forty percent of the volume of the void or grease space 50. In FIG. 4 the load of grease is shown in the outer region of the grease space 50 and is represented by the shading 70 over the portion of the grease space lying outwardly of the reference surface 69. While limited in the manner described, the volume of grease loaded into the bearing should not be less than one-fifth or twenty percent of the volume of the grease space 50 in order to provide good lubrication.

Limiting the volume of the grease loaded into the grease space 50 further extends the service life of the bearing by avoiding excessive working and aeration of the grease, tending to accelerate deterioration of the grease and expulsion of grease out through the capillary seals 63, 65 and 67.

Even though the restriction imposed on the radial extent of the grease space 50 radially beyond the bearing balls 40 may reduce the over-all volume of the grease space, in relation to that in conventional ball thrust bearings, the effective period during which the bearing 20 is adequately lubricated is extended by the fact that there is substantially no "dead" zone within the grease space lying radially beyond the bearing balls and within which grease could retreat where it would be ineffective. Whereas conventional ball thrust bearings have sometimes failed for lack of lubrication, even though substantial quantities of grease remained in the bearings, the bearing 20, by virtue of the structural relationships described, will operate to effectively consume all of the grease in the bearing to the end of the service period during which the bearing is effectively lubricated is markedly extended and the life of the bearing is effectively prolonged.

Structural components of the bearing 20a, forming the modified embodiment of the invention illustrated in FIG. 5, which are similar to components of the bearing 20 just described are identified with the same reference numbers with the addition of the suffix "a." The bearing 20a illustrated in FIG. 5 differs from the bearing 20 described primarily in the construction of the bearing spacer member 44a.

The bearing spacer member 44a of the bearing 20a is formed of sheet metal shaped to form an axially thin annular base ring 80a and radially projecting spacer element 82a. The marginal edges of the spacer elements 44a which confront successive balls 40a in the annular array of balls are turned axially in opposite directions to form for each ball a curved lip 90 which reacts on the ball to hold the ball in its proper circumferential position in relation to adjacent balls and to maintain the spacer member 44a in a predetermined axial position between the thrust members 32a, 34a, illustrated in FIG. 5.

The ball spacer member 44a thus formed cooperates with the adjacent structure to provide optimum volume within the grease space 50a for the accommodation of grease.

It will be appreciated that the invention is not necessarily limited to use of the particular structure illustrated but includes the use of alternatives and equivalents within the scope of the invention as defined by the claims.

The invention is claimed as follows:

1. A sealed ball thrust bearing comprising, in combination, two annular thrust members disposed in mutually confronting concentric relation for rotation relative to each other, said thrust members defining respectively two circular bearing ball races disposed in confronting relation to each other; an annular series of bearing balls disposed between said members in thrust bearing engagement with both of said races and being movable, in response to relative rotation of said thrust members, in an orbital path having an outer boundary; an annular bearing ball spacer disposed in concentric relation to said thrust members and including an annular series of spacer elements projecting radially outward between said thrust members in intervening relation between successive balls of said series of balls to maintain the balls in circumferentially spaced relation to each other, said spacer elements having radially outer extremities which terminate radially short of the outer boundary of said orbital path by distances which are major fractions of the radii of said balls, an outer annular shell member encircling said series of bearing balls in axially spanning relation to the space between said races, said outer shell member having two circumferential marginal edges one of which is sealably joined to one of said thrust members and the other of which is turned radially inward to form an annular lip slidably overlapping an axially outer surface on the other thrust member and forming a capillary seal therewith, said capillary seal extending radially inward to a degree such that the inner periphery of the capillary seal is located radially inward from the ball encircling portion of the outer shell member by a radial distance equal to a major fraction of the radius of each ball, said outer shell member including said lip thereon coacting with said thrust member to prevent movement of the thrust members away from each other, each of said thrust members defining a generally flat inner surface thereon extending radially outward from said race on the thrust member substantially to the portion of said outer shell member encircling the balls, said outer shell member being positioned radially in relation to said bearing balls so that the radial spacing of the individual balls from the portion of said outer shell member encircling the bearing balls between said thrust members does not exceed fifteen percent of the diameter of each bearing ball, an inner annular shell member disposed radially inward of said balls in concentric relation to said thrust members and in axially spanning relation to the space between said thrust members; said inner shell member having two circumferential marginal edges sealed to said respective thrust members, the seal between one of said thrust members and said inner shell member being formed by a capillary seal providing for free rotation of said one thrust member and said inner shell member in relation to each other; said thrust members and said inner and outer shell members as sealed together defining sealed internal void space through which said bills orbit in engagement with said races, and grease disposed in said void space and having a volume that is equal to at least twenty percent but not more than fifty percent of the volume of said void space.

2. A sealed ball thrust bearing comprising, in combination, two annular thrust members disposed in mutually confronting concentric relation for rotation relative to each other, said thrust members defining respectively two mutually confronting ball races, an annular series of bearing balls disposed in thrust bearing engagement with both races for movement through an annular path between the thrust members, an outer annular retaining element extending between said thrust members in encircling relation to said series of bearing balls, an inner annular retaining element extending between said thrust members radially inward of said bearing balls, each of said retaining elements being freely rotatable in relation to at least one of said thrust members, means on said retaining elements and said thrust members forming a circumferential grease seal between each retaining element and each thrust member in such manner that each retaining element remains free to rotate in relation to at least one of the thrust members so that the two retaining elements and the two thrust members as sealed together contain a sealed interval void space within which the bearing balls move, one of said retaining elements having an interconnecting relationship with both of said thrust members which holds the two thrust members against movement away from each other so that both thrust members are continuously retained in engagement with all of said balls, spacer means coacting with said balls to maintain the latter in predetermined circumferential positions in relation to each other; said inner and outer retaining elements, said thrust members and said spacer means being shaped and positioned in relation to each other so that no more than one-half the volume of said internal void space is disposed radially outward of an imaginary reference surface of circular cylindrical shape coaxial with said races and being located radially outward of the center of each bearing ball by a radial distance equal to one-fifth of the diameter of the ball, and grease disposed in said sealed void space and having a volume that is at least one-fifth but no more than one-half the volume of said void space.

3. A sealed ball thrust bearing comprising, in combination, two annular thrust members disposed in mutually confronting concentric relation for rotation relative to each other, said thrust members defining respectively two circular bearing ball races disposed in confronting relation to each other, an annular series of bearing balls disposed between said members in thrust bearing engagement with both of said races, an outer annular shell member encircling said series of bearing balls in axially spanning relation to the space between said races, said outer shell member having two circumferential marginal edges one of which is sealably joined to one of said thrust members and the other of which is turned radially inward to form an annular lip slidably overlapping an axially outer surface on the other thrust member and forming a capillary grease seal therewith, said outer shell member including said lip thereon coacting with said thrust members to prevent movement of the thrust members away from each other and thereby retain both thrust members in continuous engagement with all of said balls, each of said thrust members defining a generally flat surface thereon extending radially outward from said race on the thrust member substantially to the portion of said outer shell member encircling the balls, said outer shell member being positioned radially in relation to said bearing balls so that the radial spacing of the individual balls from the portion of said outer shell member encircling the bearing balls between said thrust members does not exceed fifteen percent of the diameter of each bearing ball, an inner annular shell member disposed radially inward of said balls in concentric relation to said thrust members and in axially spanning relation to the space between said thrust members; said inner shell member having two circumferential marginal edges sealed to said respective thrust members, the seal between one of said thrust members and said inner shell member being formed by a capillary grease seal providing for free rotation of said one thrust member and said inner shell member in relation to each other; said thrust members and said inner and outer shell members as sealed together defining sealed internal void space through which said balls orbit in engagement with said races, and grease sealed in said void space to lubricate the bearing through its service life.

4. A sealed ball thrust bearing comprising, in combination, two annular thrust members disposed in mutually confronting concentric relation for rotation relative to each other, said thrust members defining respectively two mutually confronting ball races, an annular series of bearing balls disposed in thrust bearing engagement with both races for movement through an annular path between the thrust members, an outer annular retaining element extending between said thrust members in encircling relation to said series of bearing balls, an inner annular retaining element extending between said thrust members radially inward of said bearing balls, each of said retaining elements being freely rotatable in relation to at least one of said thrust members, means on said retaining elements and said thrust members forming a circumferential grease seal between each retaining element and each thrust member in such manner that each retaining element remains free to rotate in relation to at least one of the thrust members so that the two retaining elements and the two thrust members as sealed together contain a sealed internal void space through which the bearing balls move, one of said retaining elements having an interconnecting relationship with both of said thrust members which holds the two thrust members against movement away from each other so that both thrust members are continuously retained in engagement with all of said balls, spacer means coacting with said balls to maintain the latter in predetermined circumferential positions in relation to each other; said inner and outer retaining elements, said thrust members and said spacer means being shaped and positioned in relation to each other so that no more than one-half the volume of said internal void space is disposed radially outward of an imaginary reference surface of circular cylindrical shape coaxial with said races and being located radially outward of the center of each bearing ball by a radial distance equal to one-fifth of the diameter of the ball, and grease sealed in said sealed void space to lubricate the bearing throughout its service life.

5. A sealed ball thrust bearing comprising, in combination, two annular thrust members disposed in mutually confronting concentric relation for rotation relative to each other, said thrust members defining respectively two mutually confronting ball races, an annular series of bearing balls disposed in thrust bearing engagement with both races for movement through an annular path between the thrust members, an outer annular retaining element extending between said thrust members in encircling relation to said series of bearing balls, an inner annular retaining element extending between said thrust members radially inward of said bearing balls, each of said retaining elements being freely rotatable in relation to at least one of said thrust members, means on said retaining elements and said thrust members forming a circumferential grease seal between each retaining element and each thrust member in such manner that each retaining element remains free to rotate in relation to at least one of the thrust members so that the two retaining elements and the two thrust members as sealed together contain a sealed internal void space through which the bearing balls move, one of said retaining elements having an interconnecting relationship with both of said thrust members which holds the two thrust members against movement away from each other so that both thrust members are continuously retained in engagement with all of said balls; said outer shell element being positioned radially in relation to said bearing balls so that the radial spacing of the individual balls from the portion of said outer shell element encircling the bearing balls between said thrust members does not exceed fifteen percent of the diameter of each bearing ball; said sealed void space being shaped and positioned in relation to said annular path of the bearing balls so that a portion of said void space is disposed radially outward of an imaginary reference surface of circular cylindrical shape, coaxial with said races and being located radially outward of the center of each bearing ball by a radial distance equal to one-fifth of the diameter of the ball, and the volume of the portion of the void space disposed radially outward of said imaginary surface is limited to one-half the total volume of the void space; and grease disposed in said sealed void space to lubricate the bearing throughout its service life.

6. A sealed ball thrust bearing comprising, in combination, two anular thrust members disposed in mutually confronting concentric relation for rotation relative to each other, said thrust members defining respectively two circular bearing ball races disposed in confronting relation to each other, an annular series of bearing balls disposed between said members in thrust bearing engagement with both of said races, an outer annular shell member encircling said series of bearing balls in axially spanning relation to the space between said races, said outer shell member having two circumferential marginal edges one of which is sealably joined to one of said thrust members and the other of which is turned radially inward to form an annular lip slidably overlapping an axially outer surface on the other thrust member and forming a capillary grease seal therewith, said outer shell member including said lip thereon coacting with said thrust members to prevent movement of the thrust members away from each other and thereby retain both thrust members in continuous engagement with all of said balls, each of said thrust members defining a generally flat surface thereon extending radially outward from said race on the thrust member substantially to the portion of said outer shell member encircling the balls, said outer shell member being positioned radially in relation to said bearing balls to provide only an assured running clearance of the individual balls relative to the portion of said outer shell member encircling the bearing balls between said thrust members, an inner annular shell member disposed radially inward of said balls in concentric relation to said thrust members and in axially spanning relation to the space between said thrust members; said inner shell member having two circumferential marginal edges sealed to said respective thrust members, the seal between one of said thrust members and said inner shell member being formed by a capillary grease seal providing for free rotation of said one thrust member and said inner shell member in relation to each other; said thrust members and said inner and outer shell members as sealed together defining sealed internal void space through which said balls orbit in engagement with said races, and grease sealed in said void space to lubricate the bearing throughout its service life.

7. A sealed ball thrust bearing comprising, in combination, two annular thrust members disposed in mutually confronting concentric relation for rotation relative to each other, said thrust members defining respectively two mutually confronting ball races, an annular series of bearing balls disposed in thrust bearing engagement with both races for movement through an annular path between the thrust members, an outer annular retaining element extending between said thrust members in encircling relation to said series of bearing balls, an inner annular retaining element extending between said thrust members radially inward of said bearing balls, each of said retaining elements being freely rotatable in relation to at least one of said thrust members, means on said retaining elements and said thrust members forming a circumferential grease seal between each retaining element and each thrust member in such manner that each retaining element remains free to rotate in relation to at least one of the thrust members so that the two retaining elements and the two thrust members as sealed together contain a sealed internal void space within which the bearing balls move, one of said retaining elements having an interconnecting relationship with both of said thrust members which holds the two thrust members against movement away from each other so that both thrust members are continuously retained in engagement with all of said balls; said sealed void space having with reference to an imaginary reference surface of circular cylindrical shape, coaxial with said races and being located radially outward of the center of each bearing ball by a radial distance equal to one-fifth of the diameter of the ball, a positional relationship such that a portion of said void space extends radially outward beyond said imaginary reference surface and the volume of the portion of the void space disposed radially outward of said reference surface is limited to one-half the total volume of the void space; and grease sealed in said sealed void space to lubricate the bearing throughout its service life.

8. A sealed ball thrust bearing comprising, in combination two annular thrust members disposed in mutually confronting concentric relation for rotation relative to each other, said thrust members defining respectively two circular bearing ball races disposed in confronting relation to each other; an annular series of bearing balls disposed between said members in thrust bearing engagement with both of said races and being movable, in response to relative rotation of said thrust members, in an orbital path having an outer boundary; an annular bearing ball spacer disposed in concentric relation to said thrust members and including an annular series of spacer elements projecting radially outward between said thrust members in intervening relation between successive balls of said series of balls to maintain the balls in circumferentially spaced relation to each other, said spacer elements having radially outer extremities which terminate radially short of the outer boundary of said orbital path by distances which are major fractions of the radii of said respective balls; each of said spacer elements having a thickness, measured axially with respect to the bearing, which is only a minor fraction of the diameter of each bearing ball; an outer annular shell member encircling said series of bearing balls in axially spanning relation to the space between said races, said outer shell member having two circumferential marginal edges one of which is sealably joined to one of said thrust members and the other of which is turned radially inward to form an anuular lip slidably overlapping an axially outer surface on the other thrust member and forming a capillary seal therewith, said capillary seal extending radially inward to a degree such that the inner periphery of the capillary seal is located radially inward from the ball encircling portion of the outer shell member by a radial distance equal to a major fraction of the radius of each ball, said outer shell member including said lip thereon coacting with said thrust members to prevent movement of the thrust members away from each other, each of said thrust members defining a generally flat inner surface thereon extending radially outward from said race on the thrust member substantially to the portion of said outer shell member encircling the balls, said outer shell member being positioned radially in relation to said bearing balls so that the individual balls have a limited radial spacing from the encircling portion of said outer shell member that is only sufficient to assure a free runinng clearance for orbital movement of all the balls, an inner annular shell member disposed radially inward of said balls in concentric relation to said thrust members and in axially spanning relation to the space between said thrust members; said inner shell member having two circumferential marginal edges sealed to said respective thrust members, the seal between one of said thrust members and said inner shell member being formed by a capillary seal providing for free rotation of said one thrust member and said inner shell member in relation to each other; said thrust members and said inner and outer shell members as sealed together defining sealed internal void space through which said balls orbit in engagement with said races, and grease disposed in said void space and having a volume that is equal to at least twenty percent but not more than fifty percent of the volume of said void space.

References Cited by the Examiner

UNITED STATES PATENTS 2,230,471   2/1941   Stein _____ 308—233

DAVID J. WILLIAMOWSKY, *Primary Examiner.*

FRANK SUSKO, *Assistant Examiner.*